United States Patent
Bauer et al.

[11] Patent Number: 6,152,437
[45] Date of Patent: Nov. 28, 2000

[54] CLAMPING DEVICE FOR AT LEAST ONE ADJUSTABLE ELEMENT, PREFERABLY FOR A WORKING SPINDLE OF A MACHINE, PREFERABLY A MACHINE FOR MACHINING WORKPIECES OF WOOD, PLASTIC MATERIAL ETC

[75] Inventors: Robert Bauer, Werbach-Wenkheim; Albrecht Dawidziak, Grossrinderfeld; Heinrich Englert, Lauda-Königshofen; Thomas Hohstadt, Boxberg-Unterschüpf; Hubert Klein, Wertheim-Nassig, all of Germany

[73] Assignee: Michael Weinig Aktiengesellschaft, Germany

[21] Appl. No.: 09/071,435

[22] Filed: May 1, 1998

[30] Foreign Application Priority Data

May 2, 1997 [DE] Germany .............................. 197 18 600

[51] Int. Cl.[7] ...................................................... B25B 5/10
[52] U.S. Cl. .......................................... 269/329; 269/244
[58] Field of Search .................................... 269/329, 244, 269/242, 246, 71, 73

[56] References Cited

U.S. PATENT DOCUMENTS 4,593,892  6/1986  Terstegge ................................. 269/244

*Primary Examiner*—Robert C. Watson
*Attorney, Agent, or Firm*—Robert W. Becker & Associates

[57] ABSTRACT

A clamping device for at least one adjustable element has at least one adjusting spindle designed to receive a crank for adjusting the element. Upon pushing the crank unto the adjusting spindle, a signal for releasing the clamping action is triggered.

14 Claims, 7 Drawing Sheets

CLAMPING DEVICE FOR AT LEAST ONE ADJUSTABLE ELEMENT, PREFERABLY FOR A WORKING SPINDLE OF A MACHINE, PREFERABLY A MACHINE FOR MACHINING WORKPIECES OF WOOD, PLASTIC MATERIAL ETC

BACKGROUND OF THE INVENTION

The present invention relates to a clamping device for at least one adjustable element, preferably for a working spindle of a machine, preferably a machine for machining workpieces of wood, plastic material etc. comprising at least one adjusting spindle onto which a crank for adjusting the element can be slipped.

In machines, especially wood working machines, it is known to clamp the respective working spindle in a respective radial and axial position. The working spindle may be a right or a left vertical, an upper or lower working spindle. The working spindle is seated axially slidably on a spindle carriage which itself is adjustable in the longitudinal direction on a carriage guide of the machine. When the axial and/or radial position of the working spindle is to be adjusted, a crank is placed onto the respective adjusting spindle. Before the crank is turned, a lever is used to release the respective clamping action of the spindle carriage or the spindle sleeve. After adjustment of the working spindle by turning the crank, the lever again activates the clamping action and, subsequently, the crank is removed from the adjusting spindle. The manipulation for adjusting and clamping of the working spindle in the respective radial and/or axial position is complicated.

It is therefore an object of the present invention to embody the clamping device of the aforementioned kind such that an adjustment of the element of the machine is simple and possible with only a few manipulation steps.

SUMMARY OF THE INVENTION

The clamping device according to the present invention for at least one adjustable element comprises at least one adjusting spindle designed to receive a crank for adjusting the element, wherein, upon pushing the crank onto the adjusting spindle, a signal for releasing the clamping action is triggered.

Advantageously, the signal controls a directional control valve which actuates a piston-cylinder unit for releasing the clamping action.

Preferably, the clamping device comprises a sensor that is positioned within the travel path of the crank when pushing the crank onto the adjusting spindle. The sensor controls the directional control valve.

Advantageously, the directional control valve is actuated by a control valve.

Preferably, the sensor actuates the control valve.

Expediently, the sensor is an actuating rod that is moved when the crank is pushed onto the adjusting spindle. The movement of the actuating rod actuates the control valve.

Advantageously, the sensor is a proximity sensor.

The sensor in a preferred embodiment of the invention preferably directly electrically actuates the directional control valve.

Preferably, the clamping action is activated when the crank is removed.

The directional control valve is preferably a 5/2-port valve.

Advantageously, the control valve is a 3/2-port valve.

The actuating rod is preferably moved against the spring force when the crank is pushed onto the adjusting spindle.

The actuating rod is forced by the spring force against an abutment of the clamping device when the crank is removed.

In the inventive clamping device, the action of pushing the crank onto the respective adjusting spindle provides a signal for releasing the clamping action so that simultaneously with pushing of the crank onto the adjusting spindle the clamping action is automatically released. Therefore, it is no longer necessary to release the clamping action by a second manipulation step. Thus, in one simple action, the crank is pushed onto the adjusting spindle and can be immediately turned in the desired direction for adjusting the adjustable element. Due to the automatic release of the clamping action upon pushing the crank onto the adjusting spindle, there is also a reduced risk in regard to confusing the required manipulation steps for the respective adjusting spindle.

BRIEF DESCRIPTION OF DRAWINGS

The object and advantages of the present invention will appear more clearly from the following specification in conjunction with the accompanying drawings, in which.

DESCRIPTION OF PREFERRED EMBODIMENTS

Figure 1:
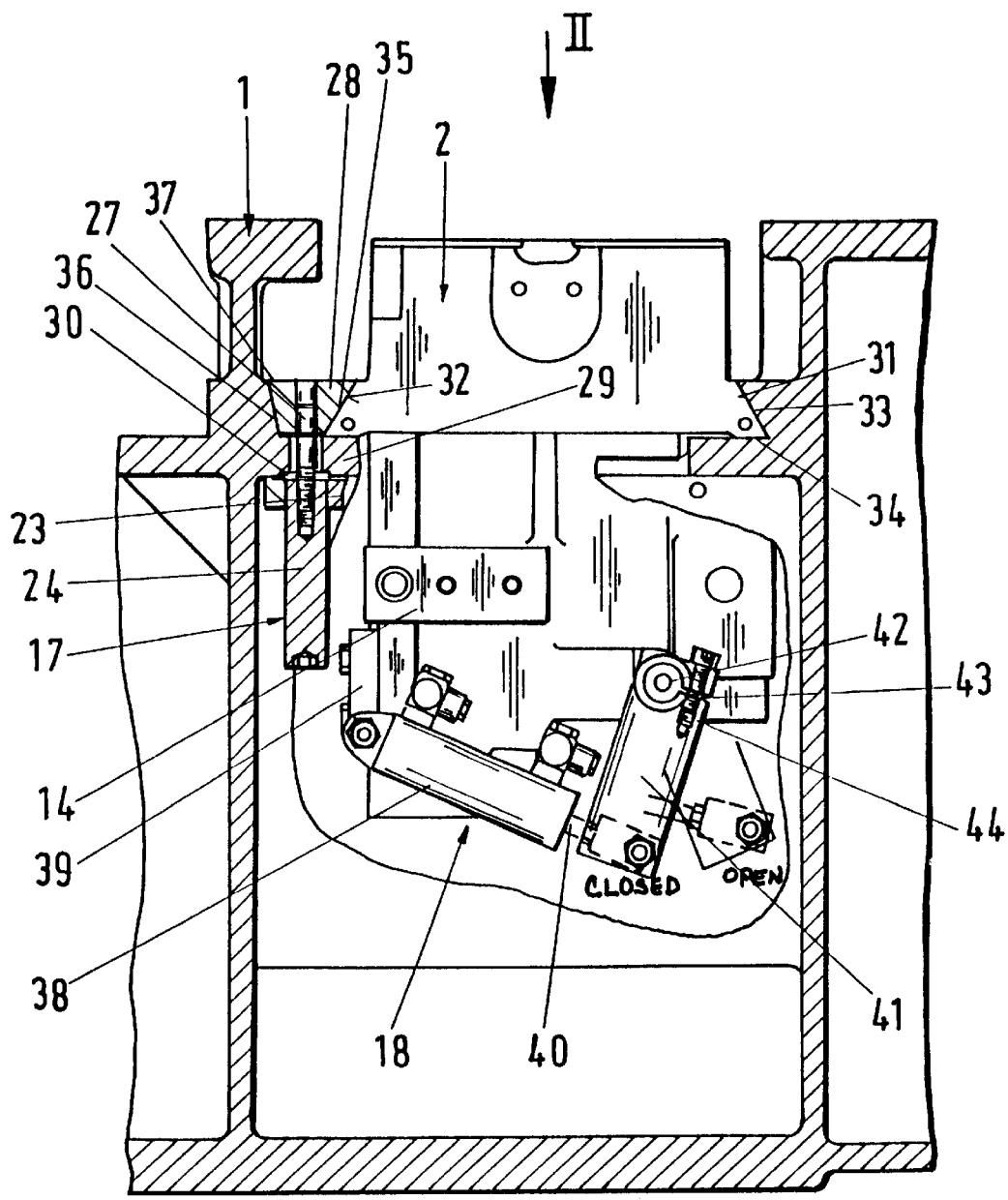
FIG. 1 shows, partly in section and partly broken away, a front view of the right vertical spindle which is mounted within a machine frame and which is clampable with the inventive clamping device.

The present invention will now be described in detail with the aid of several specific embodiments utilizing FIGS. 1 through 7.

The clamping device disclosed in the following serves for automatically clamping axial and radial working spindle in their adjustment positions. The working spindle is advantageously part of a machine for machining wood, plastic material etc. and supports fixedly a corresponding tool. The machine comprises a frame or stand 1, in which the spindle carriage 2 is slidably supported. It is provided with a receiving member 3 (FIG. 2) for a working spindle 4 (FIG. 3) which, in the shown embodiment, is the right vertical spindle of the machine. With the spindle carriage 2 the working spindle 4 can be displaced or moved in the radial direction 5 (FIG. 3) in a manner known per se. The working spindle 4 can also be moved in the axial direction 6. The working spindle 4 is seated within a spindle sleeve 7 (FIG. 3) which is axially moveably supported in the spindle carriage 2. A gear housing 8 is provided at the spindle carriage 2 from which adjusting spindle 9 extends in the downward direction. A horizontal adjusting spindle 10 projects into the gear housing 8 which serves to provide the axial adjustment of the working spindle 4. The two spindles 9 and 10 support meshing bevel gears 11, 12.

The radial adjustment of the working spindle 4 is provided by a horizontally extending adjusting spindle 13 which has seated thereon a nut 14 which is fixedly connected to the spindle carriage 2. With this nut 14 the rotation of the adjusting spindle 13 radially moves the spindle carriage 2 and thus the working spindle 4 into the desired position. For the axial movement of the working spindle 4 a nut 15 (FIG. 3) is provided which cooperates with the adjusting spindle 9 and which is fixedly connected to the spindle sleeve 7. When the adjusting spindle 9 is rotated by the adjusting spindle 10 and the bevel gear system 11, 12 the working spindle 4 is axially adjusted via nut 15 and the spindle sleeve 7.

For the radial and axial adjustment a crank 16 (FIG. 3) is pushed onto the respective adjusting spindle 13, 10 and is connected to the respective adjusting spindle such that a fixed connection for transmitting rotary movement results. Upon turning in the desired direction, the working spindle 4 is radially or axially moved in the afordescribed manner in the desired direction.

In order to secure the respective radial and axial position of the working spindle 4, a radial clamping device 17 (FIG. 3) and an axial clamping device 18 are provided.

Figure 2:
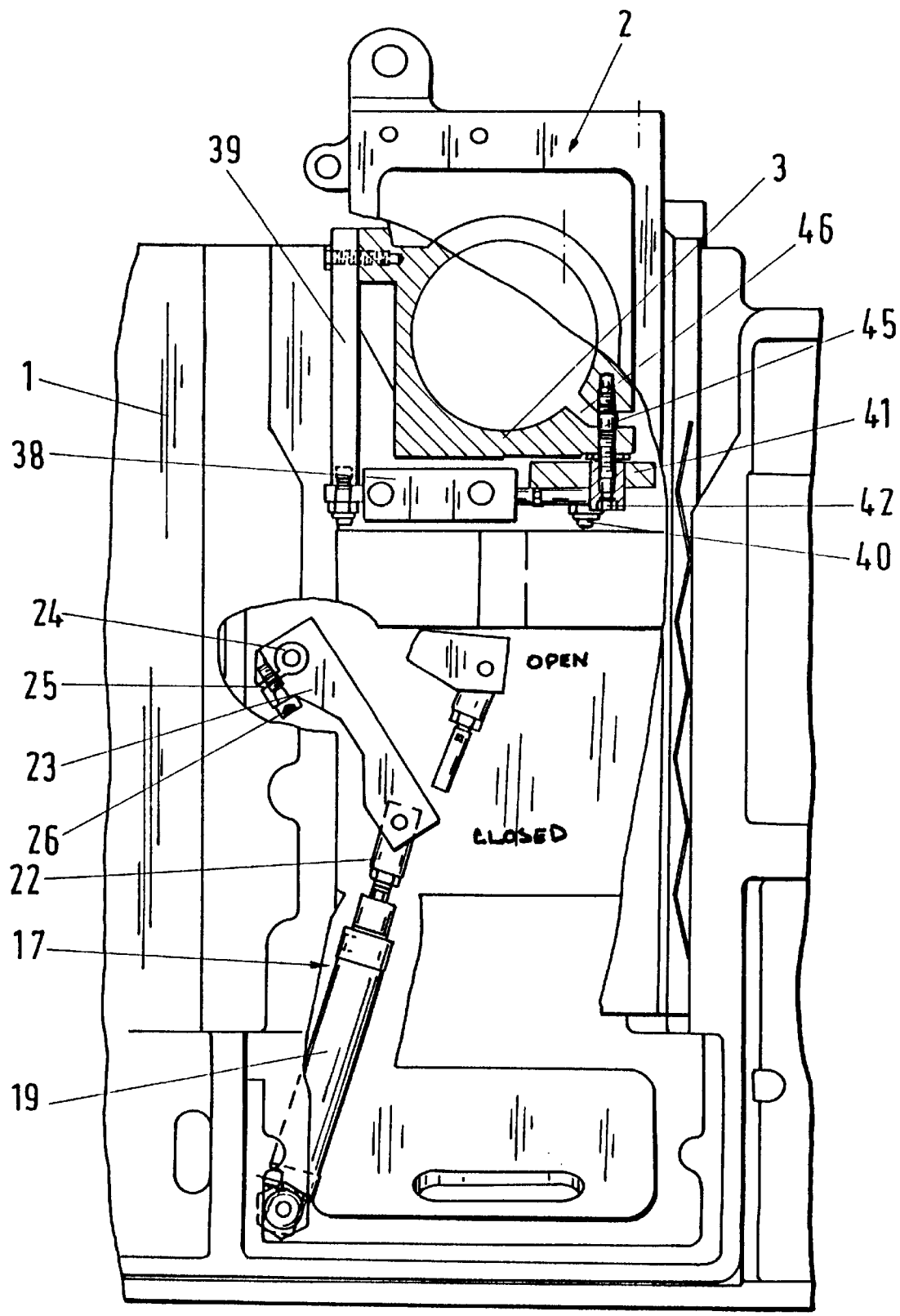
FIG. 2 shows a view in the direction of arrow 11 in FIG. 1.
Figure 3:
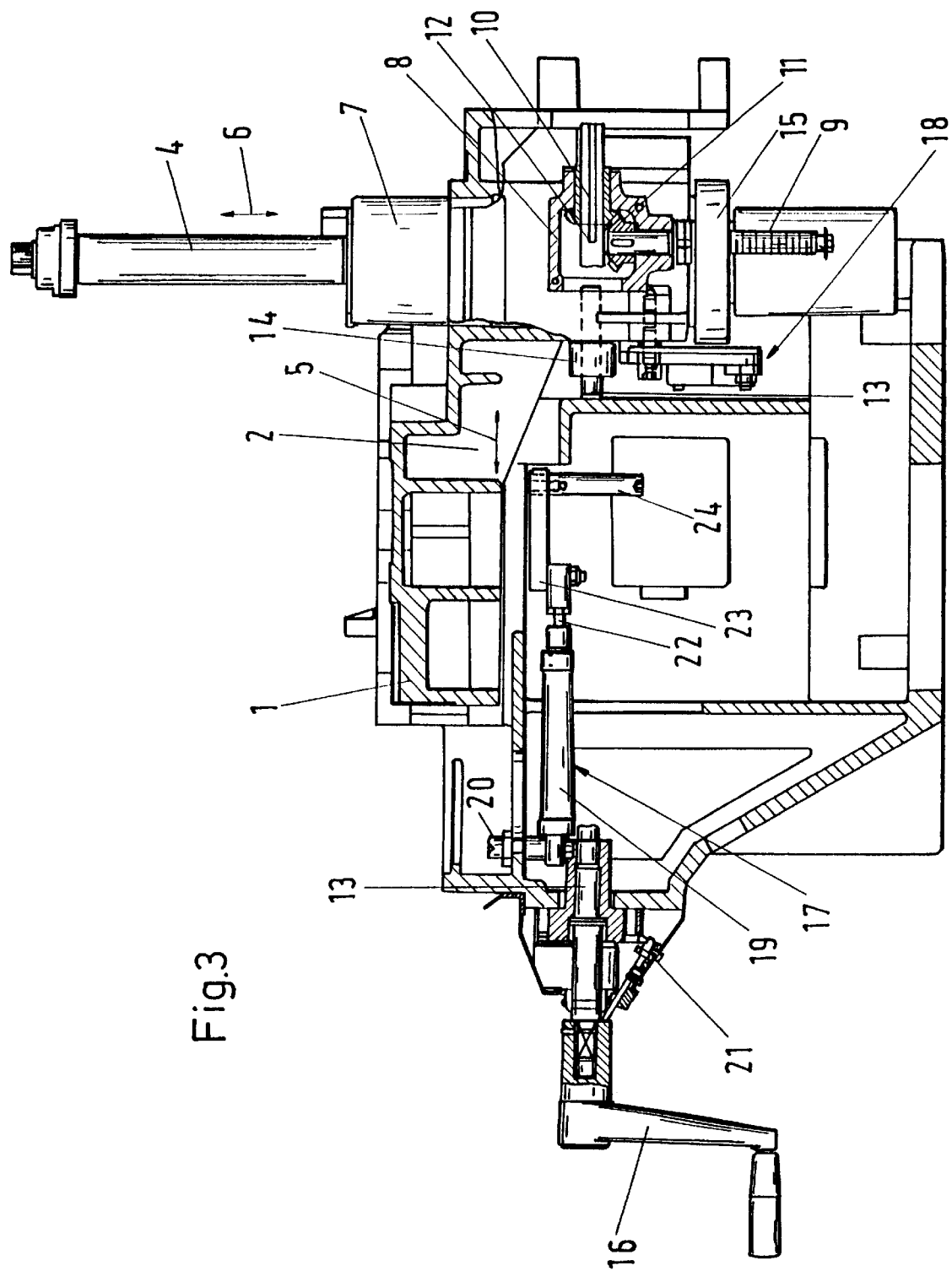
FIG. 3 shows, partly in section and partly broken away, a view in the direction of arrow III of FIG. 1.

The radial clamping device 17 comprises a clamping cylinder 19 (FIGS. 2 and 3) which is supported at the machine frame 1 so as to be pivotable about a vertical axis at one end thereof. As shown in FIG. 3, for the pivotable support of the clamping cylinder 19 a threaded screw 20 with pin is provided which is secured by a lock nut 21. The free end of the piston rod 22 is connected to a clamping lever 23 which is clamped onto a clamping nut 24. The clamping lever 23 is embodied in the area of the clamping nut 24 in the form of a bracket and has a slot 25 (FIG. 2) which is penetrated by the clamping screw 26. With it, the clamping lever 23 is clamped onto the clamping nut 24. It is positioned vertically (FIGS. 1 to 3) and seated, as shown in FIG. 1, on a threaded pin 27 which pulls downwardly a bar 28 of a trapeze-shaped cross-section. Between the clamping nut 24 and the frame part 29 an axial bearing 30 (FIG. 1), preferably an axial needle bearing, is provided. It ensures that the clamping nut 24 can be easily rotated, for radial clamping of the working spindle 4. The spindle carriage 2 comprises at its two lateral edges in the lower area downwardly diverging lateral surfaces 31 and 32. The lateral surface 31 rests at a correspondingly slantedly extending sidewall 33 of the guide 34 of the machine frame 1. Via the other lateral surface 32 the carriage 2 rests over a large surface area on the sidewall 35 of the clamping bar 28. The oppositely arranged sidewall 36 of the clamping bar 28 rests over a large surface area at the other sidewall 37 of the guide 34. The carriage guide 34 together with the clamping bar 28 thus provides a dove tail guide for the spindle carriage 2. The two sidewalls 35 and 36 of the clamping bar 28 converge downwardly. When the clamping bar 28 is pulled downwardly by the clamping nut 24 and the threaded pin 27, the spindle carriage 2 is clamped in its respective position within the carriage guide 34. In order to realize this clamping action, the piston rod 22 of the clamping cylinder 19 is moved inwardly, so that the clamping lever 23 in the representation of FIG. 2 is pivoted in the clockwise direction about the axis of the clamping nut 24. The clamping nut 24, in turn, is rotated in the same direction since it is fixedly connected to the clamping lever 23. The threaded pin 27 cooperating with a clamping nut 24 is axially downwardly moved so that the clamping bar 28 is pulled in the downward direction into the carriage guide 34 so that the spindle carriage 2 is thus clamped. When it is desired to release the clamping action, the piston rod 2 of the clamping cylinder 19 is moved outwardly so that the clamping lever 23 in the representation according to FIG. 2 is moved counter-clockwise into the position identified as "open". Accordingly, via the clamping nut 24 and the threaded pin 27 the clamping bar 28 is relieved, respectively, pushed upwardly so that the spindle carriage 2 can be moved subsequently by the adjusting spindle 13 into the desired direction within the carriage guide 34 for radial adjustment of the working spindle 4.

As shown in FIG. 1, the threaded pin 27 penetrates the frame part 29 with play so that the spindle carriage 2 is reliably clamped, respectively, released.

The axial clamping device is substantially embodied identically to the radial clamping device 17. It also comprises a clamping cylinder 38 which is pivotably supported about a horizontal axis at a securing plate 39 (FIGS. 1 and 2) which is connected to the spindle carriage 2, preferably by screws. The free end of the piston rod 40 has connected thereto a clamping lever 41 which, with its other end, is fixedly clamped onto the horizontally positioned clamping nut 42. For this purpose, the clamping lever 41 has a slot 43 which is penetrated by a clamping screw 44. With it the clamping lever 41 is clamped within the area of the slotted end of the clamping nut 42. It cooperates with a threaded pin 45 (FIG. 2), which penetrates a slot 46 radially extending through the spindle receiving member 3. Upon tightening the threaded pin 45 the spindle receiving member 3 is pulled together in the manner of a clamping bracket so that the spindle sleeve 7 supported within the spindle receiving member 3 is clamped in the respective axial position.

When the axial clamping device 18 is in the "closed" position indicated in FIG. 1, in which the piston rod 40 is moved inwardly, the clamping lever 41 is pivoted so that the threaded pin 45 contracts the spindle receiving member 3 to such an extent that the spindle sleeve 7 is clamped fixedly thereat. When it is desired to release the axial clamping action, the piston rod 40 is moved out of the clamping cylinder 38 so that the clamping lever 41 in the representation according to FIG. 1 is pivoted counter clockwise about its pivot axis. The clamping nut 42, which is fixedly connected to the clamping lever 41, is rotated such that the force applied via the threaded pin 45 onto the spindle receiving member 3 is compensated so that the clamping of the spindle sleeve 7 is released. With a crank pushed onto the adjusting spindle, the working spindle 4 with the spindle sleeve 7 can be axially adjusted in the desired direction.

The adjusting spindle 13 for radially adjusting the working spindle 4 is rotatably supported in a receiving flange 47 (FIG. 4) which is advantageously connected by screws to the frame 1. Within the receiving flange 47 the adjusting spindle 13 is axially secured by axial bearings 48 and 49 which are preferably axial needle bearings. Furthermore, on the adjusting spindle 13 two nuts 50 and 51 are provided which rest at one another and secure the axial bearing 49 arranged at the end face of the receiving flange 47. Within the receiving flange 47 the axial bearing 48 is secured axially by a ring 52 which rests at the collar 53 of the adjusting spindle 10.

The end 54 of the control spindle 13 projecting from the frame 1 is embodied as a square member onto which the crank 16 is pushed which has a matching cross-sectional square receiving member 55 for the adjusting spindle end 54. The adjusting spindle 54 has an annular groove 56 into which the ball 57 of a pressure spring member 58 projects that is supported at the wall of the receiving member 55 of the crank 16. A display is positioned below a cover 59 at the frame 1. The display is preferably a digital display which can be read easily through the window 61 at the cover 59. The display 60 is positioned in the area above the adjusting spindle 13 and is detachably fastened to the receiving flange 47.

Figure 4:
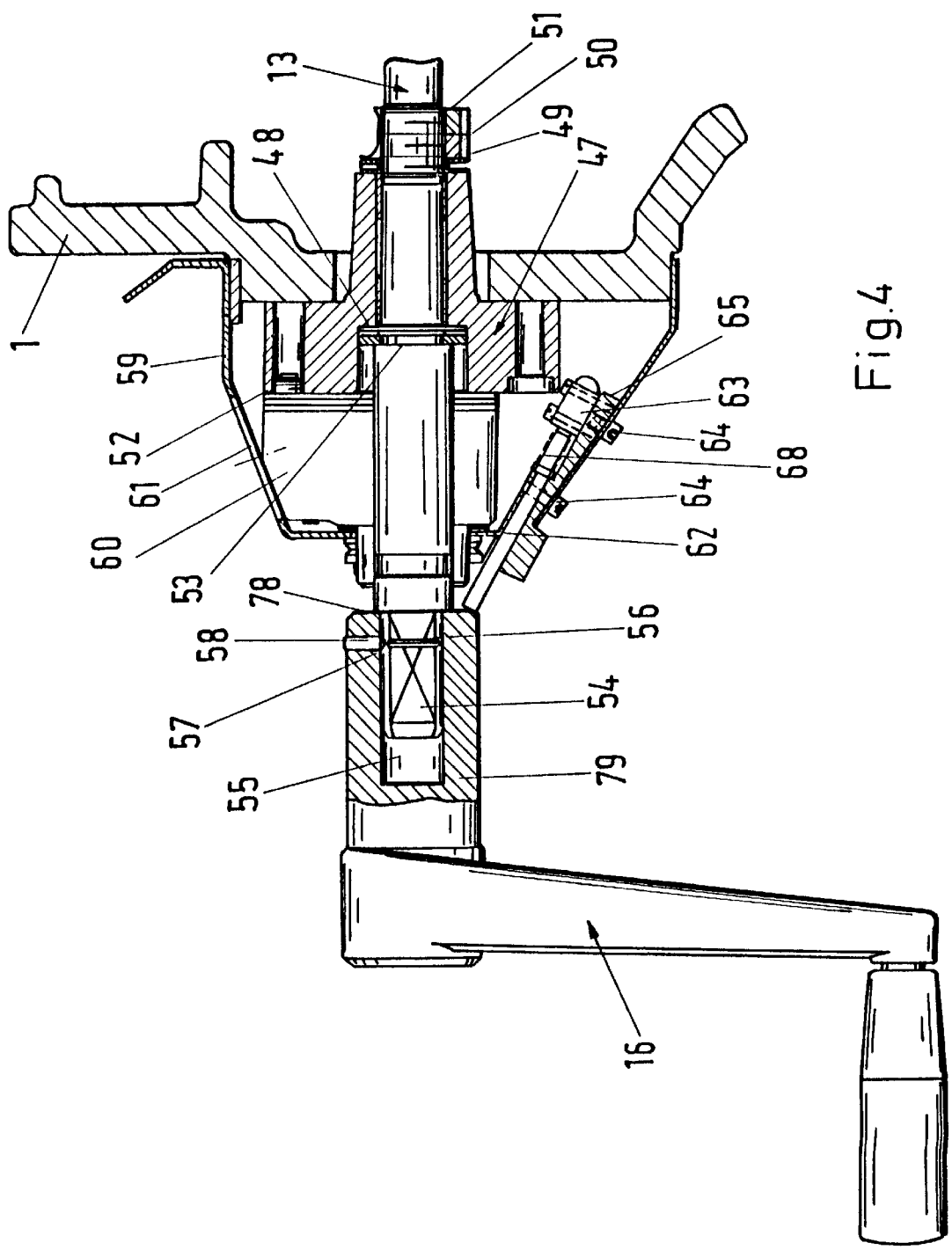
FIG. 4 shows an enlarged representation of a detail of FIG. 3.

In the area below the adjusting spindle 13 an actuating push rod 62 for a pneumatic control valve 63 in the form of a 3/2-port valve is provided. The control valve 63 is connected to a holder 65 which is fastened by screws 64 to the inner side of the cover 59 (FIGS. 4 and 7).

Figure 7:
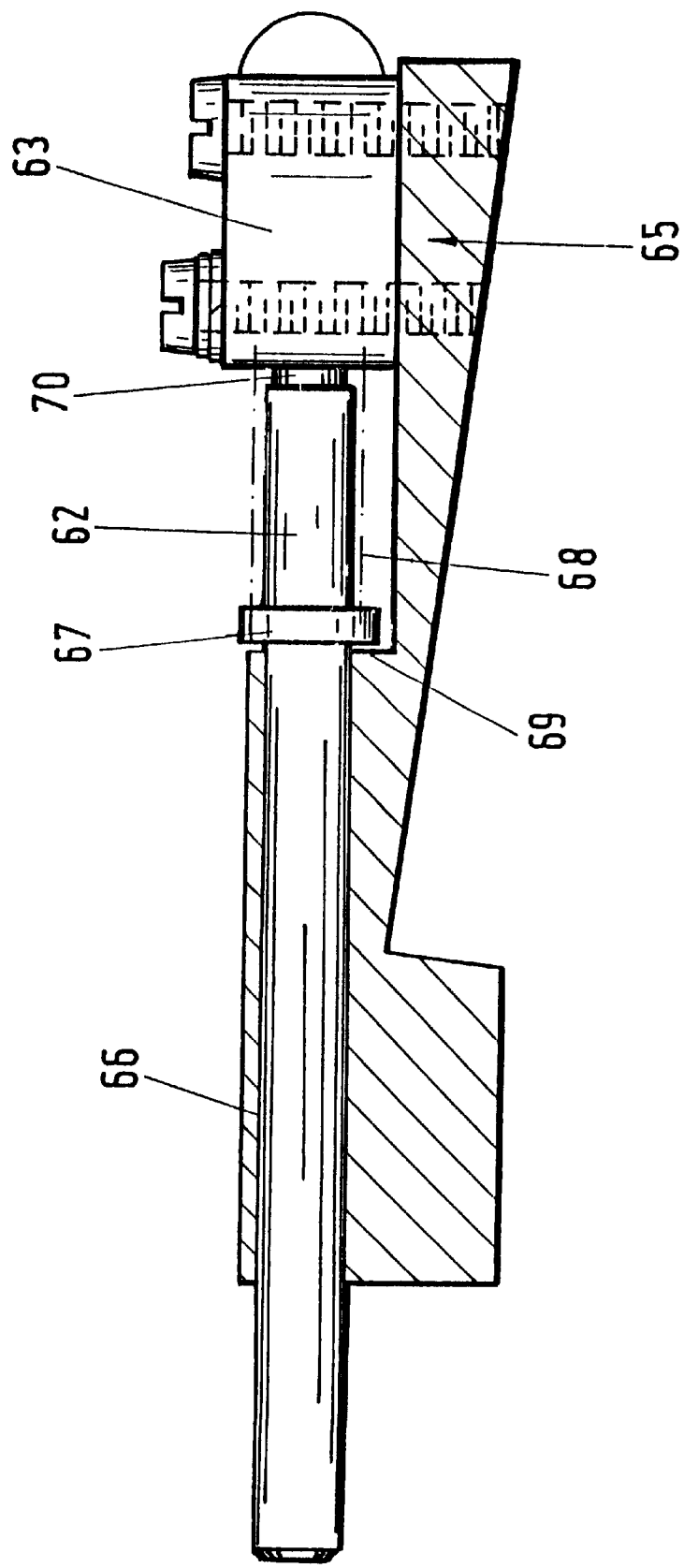
FIG. 7 shows an enlarged representation of the actuating rod of the inventive clamping device.

As shown in FIG. 7, the holder 65 is provided with a through bore 66 through which the actuating rod 62 penetrates to the exterior from the holder 65. The actuating rod 62 is provided in the area between the through opening 66 and the control valve 63 with a collar 67 at which one end of the pressure spring 68 surrounding the actuating rod 62 rests. The other end is supported at the housing of the control valve 63. The pressure spring 68 loads the actuating rod 62 in the direction onto the adjusting spindle end 54 (FIG. 4). When the crank 16 is not positioned on the crank spindle 13, the collar 67 of the adjusting spindle 10 is forced by the force of the pressure spring 68 onto a wall (abutment) 69 of the holder 65 extending transverse to the axis of the actuating rod 62. The actuating rod 62 itself rests on a push rod 70 of the control valve 63 (FIG. 7).

In the area of the adjusting spindle 10 for the axial movement of the working spindle 4 an actuating rod with valve is provided as has been explained in connection with the adjusting spindle 13. In the drawings these devices are not represented in order to facilitate the understanding of the drawings. When thus in the following the automatic release of the clamping action of the spindle carriage upon pushing of the crank 16 onto the spindle 13 is disclosed, this applies in the same sense to placing of the crank 16 onto the adjusting spindle 10 for axial movement of the working spindle 4.

Figure 6:
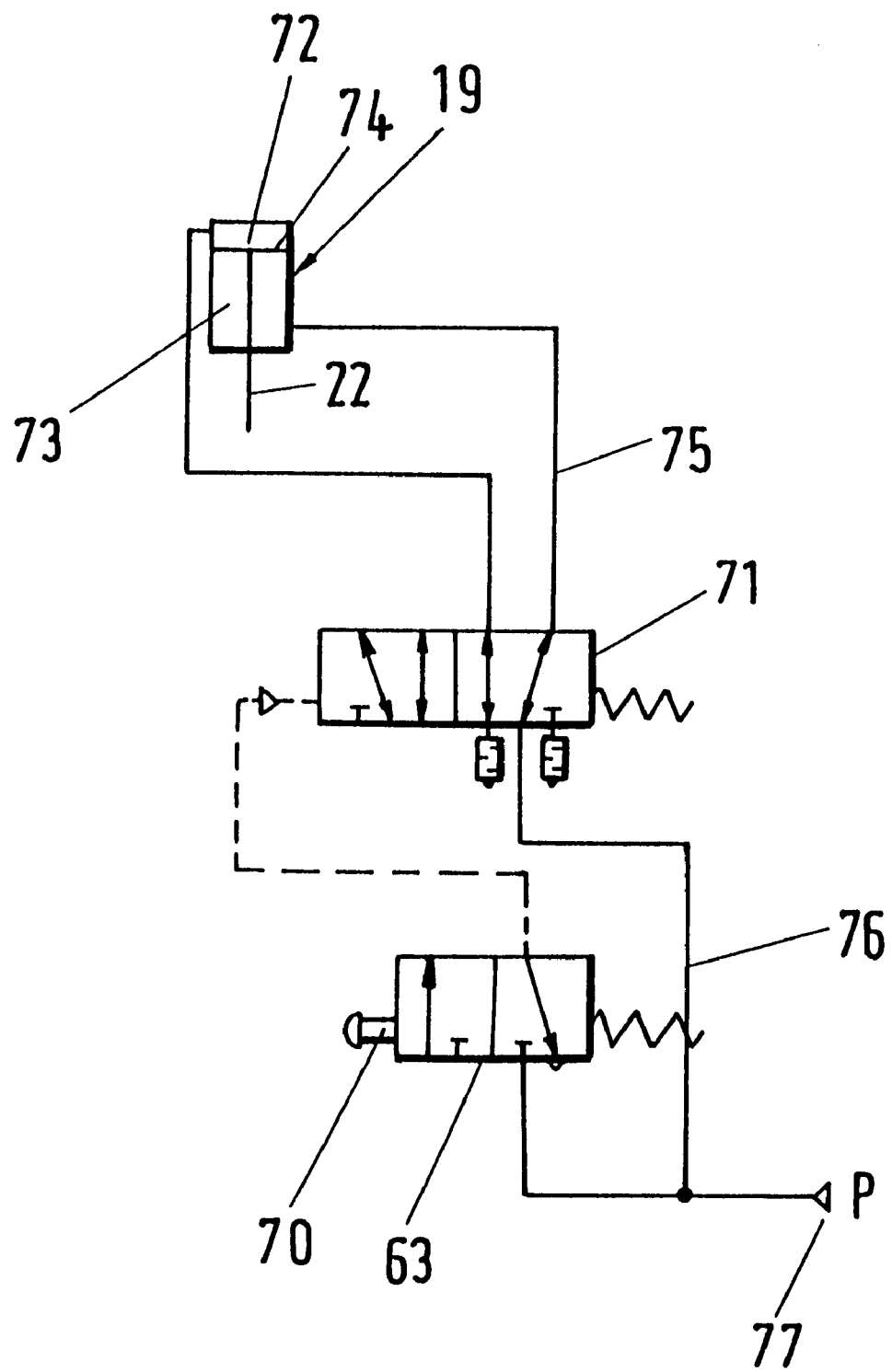
FIG. 6 shows a pneumatic switching diagram of the inventive clamping device.

Thus, as long as the crank 16 is not positioned on the adjusting spindle 13, the actuating rod 62 is moved by the spring force 68 until the collar 67 of the actuating rods 62 rests at the abutment (wall) 69 of the holder 65. Downstream of the valve 63, a 5/2-port directional control valve 71 (FIG. 6) is provided that, in the same manner as the control valve 63, is a pneumatic valve. The clamping cylinder 19 of the radial clamping device 17 has two pressure chambers 72 and 73 which are separated by piston 74 on the piston rod 22 of the clamping cylinder 19. FIG. 6 shows the clamping position in which the spindle carriage 2 is clamped by the clamping bar 28 in the adjusted radial position. The piston rod 22 is moved into the clamping cylinder 19. The pressure chamber 73 of the clamping cylinder 19 is connected by lines 75 and 76 to a pressure medium 77. In the shown embodiment compressed air is provided as a pressure medium which is already present at the machine. Since no crank 16 has been pushed onto the adjusting spindle 13, the valve rod 70 is positioned in its released position while the actuating rod 62 under the force of the pressure spring 68 also assumes an extended position in which it rests with the collar 67 at the abutment (wall) 69. In this position the control valve 63, which controls the directional control valve 71, is locked so that the pressure medium source 77 is connected by lines 75, 76 and the valve 71 to the pressure chamber 73 of the clamping cylinder 19.

When it is desired to move the spindle carriage 2 in the carriage guide 34 for the purpose of radial displacement of the working spindle 4, the crank 16 is pushed onto the end 54 of the adjusting spindle 13 (FIGS. 3 and 4). The end face 78 of the sleeve 79 of the crank 16 comprising the receiving opening 55 contacts the actuating rod 62 and moves it against the force of the compression spring 68. The pressure member 58 and the annular groove 56 ensure a precise position of the sleeve 79 on the adjusting spindle 13 so that a corresponding precise travel stroke of the actuating rod 62 is provided. Furthermore, it is prevented that the crank 16 can be moved backwards by the force of the compression spring 68. The actuating rod 62 actuates via the valve rod 70 the control valve 63 which is thus switched. The valve 63 controls the directional control valve 71 such that the pressure chamber 72 of the clamping cylinder 19 is connected to the pressure medium source 77. The piston rod 22 is thus moved outwardly, and, in the disclosed manner, the clamping lever 23 is pivoted such that the clamping bar 28 is released. The spindle carriage 2 can thus be moved for radial displacement of the working spindle 4. The radial clamping action is automatically achieved by placing the crank 16 onto the adjusting spindle. For releasing the clamping action, no separate manipulation is required. By turning the crank 16 the spindle carriage 2 is moved in the desired direction. When the crank 16 is removed from the end 54 of the adjusting spindle, the actuating rod 62 is returned by the force of the spring 68 into its initial positions so that valve 63 is again returned into the position represented in FIG. 6. Accordingly, the valve 71 is switched by the spring force into the position shown in FIG. 6 so that the pressure chamber 73 of the clamping cylinder 19 is connected to the pressure medium source 77. Thus, the piston rod 22 is returned inwardly and the clamping lever 23 is pivoted back into the position "closed" according to FIG. 2. The clamping bar 28 is downwardly pulled in the aforedescribed manner into its clamping position in which it clamps the carriage 2 in its new position at the guide 34. For the clamping action no additional manipulation is required. Instead, the clamping action is automatically performed upon removing the crank 16 from the adjusting spindle 13.

Onto both ends of the piston 74 the same pressure will act, whereby, however, in the pressure chamber 73 a piston surface, reduced by the cross-sectional surface area of the piston rod 22, is present. Accordingly, the force for moving the piston rod 22 out is greater than the force required for moving it in so that the clamping action can be reliably released when the valve 71 is switched in the afordescribed manner.

In the same manner, the placement of the crank 16 onto the adjusting spindle 10 releases automatically and without additional manipulation the axial clamping action of the spindle sleeve 7 and thus of the working spindle 4 whereby the clamping cylinder 38 of the axial clamping device 18 is loaded such that the piston rod 40 is moved out. The clamping lever 41 is thus pivoted into the position "open" according to FIG. 1 in which the clamping action of the spindle sleeve 7 is released. For automatically releasing the clamping action, valves corresponding to the valves 63 and 71 of the radial clamping device 17 are provided. When the crank 16, after axial movement of the working spindle 4, is removed from the adjusting spindle 10, the respective actuating rod is automatically returned by the spring force into its initial position so that the respective valves are switched, the piston rod 40 of the clamping cylinder 38 is moved inward, and the clamping lever 41 is pivoted into the positioned "closed" according to FIG. 1. In this manner, the spindle sleeve 7 is clamped in its new axial position. The two valves 63 and 71 can also be provided as a constructive unit.

The pressure medium may also be in the form of a hydraulic medium. The actuation of the control valve 63 can also be provided by a roller or lever instead of the actuating rod. Also, for the actuation of the valves 63 or 71 inductive or capacitive proximity sensors etc. can be employed. Furthermore, electric end position switches can be actuated by push rods or levers in order to activate the valve 63 or directly the valve 71. The direct electrical contact on the respective control spindle 10, 13 is also possible in order to release or activate the clamping action automatically. In general, any sensor is suitable which upon placement of the crank 16 onto the respective adjusting spindle 10, 13 produces a signal for releasing the clamping action and upon removal of the crank produces the signal for actuating the clamping action.

Figure 5:
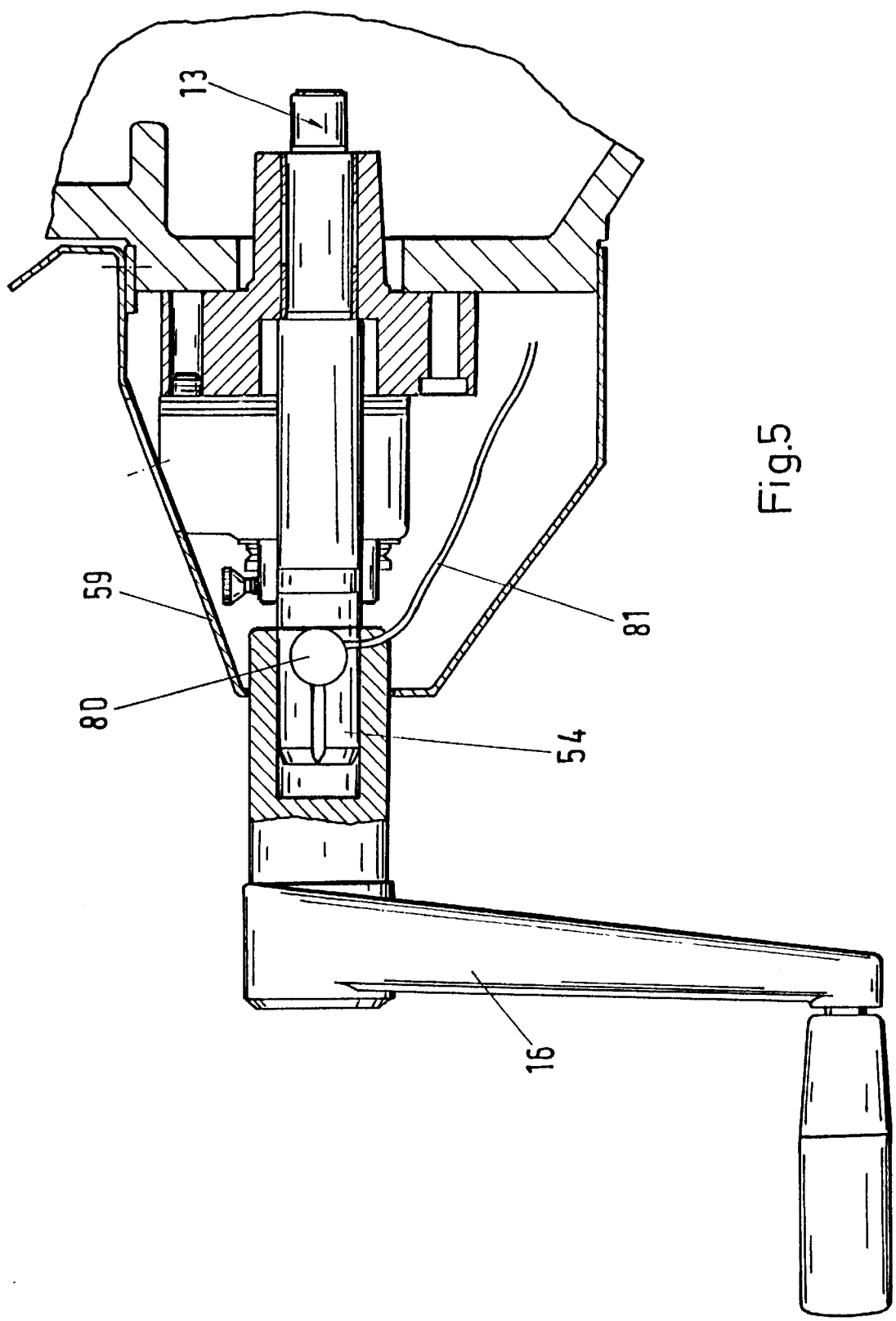
FIG. 5 shows in a representation corresponding to FIG. 4 a part of a second embodiment of the inventive clamping device.

FIG. 5 shows as an example the possibility of placing the crank 16 onto the end 54 of the adjusting spindle 13 whereby with an inductive proximity sensor 80 the clamping action is automatically released. The proximity sensor 80 is fastened within the cover 59 and connected by line 81 to the directional control valve 71 (FIG. 6). The proximity sensor 80 is positioned in the cover 59 such that upon placement of the crank 16 the sensor 80 provides a switching signal via line 81 to the valve 71. When the crank 16 has been positioned, the valve 71 is automatically switched in the afordescribed manner so that the movement of the piston rod 22 automatically releases the clamping action of the clamping bar 28. After rotation of the adjusting spindle 13 to the desired position, crank 16 is removed. As soon as the predetermined spacing to the proximity sensor 80 has been produced, the respective switching signal is produced via line 81 for switching the valve 71 into the position represented in FIG. 6 so that the clamping bar 28 is returned in the disclosed manner into the clamping position. In this embodiment, valve 63 is not required.

It is also possible to integrate the sensor into the sleeve part 79 of the crank 16.

The disclosed automatically operating clamping devices 17, 18 can be provided in wood working machines not only at the right vertical spindle but also at any other working spindle of such wood working machines. The clamping devices 17, 18 can also be used for clamping other adjustable components, for example, pressing elements of a machine.

The specification incorporates by reference the disclosure of German priority document 197 18 600.9 of May 2, 1997.

The present invention is, of course, in no way restricted to the specific disclosure of the specification and drawings, but also encompasses any modifications within the scope of the appended claims.

What is claimed is:

1. A clamping device for at least one adjustable element comprising at least one adjusting spindle designed to receive a crank for adjusting the element, wherein upon pushing the crank onto said adjusting spindle a signal for releasing the clamping action is triggered, said signal adapted to actuate a releasing unit for releasing the clamping action.

2. A clamping device according to claim 1, wherein said releasing unit is a piston-cylinder unit.

3. A clamping device according to claim 2, wherein a sensor is positioned within a travel path of the crank when pushing the crank onto said adjusting spindle and wherein said sensor controls said directional control valve.

4. A clamping device according to claim 2, wherein said directional control valve is actuated by a control valve.

5. A clamping device according to claim 4, wherein said sensor actuates said control valve.

6. A clamping device according to claim 4, wherein said sensor is an actuating rod that is moved when the crank is pushed onto the adjusting spindle and actuates said control valve.

7. A clamping device according to claim 3, wherein said sensor is a proximity sensor.

8. A clamping device according to claim 7, wherein said sensor directly electrically actuates said directional control valve.

9. A clamping device according to claim 1, wherein when the crank is removed the clamping action is activated.

10. A clamping device according to claim 2, wherein said directional control valve is a 5/2-port valve.

11. A clamping device according to claim 4, wherein said control valve is a 3/2-port valve.

12. A clamping device according to claim 6, wherein said actuating rod is moved against a spring force when the crank is pushed onto said adjusting spindle.

13. A clamping device according to claim 12, wherein said actuating rod is forced by said spring force against an abutment of said clamping device, when said crank is removed.

14. A clamping device according to claim 2, wherein said piston-cylinder unit is controlled by a directional control valve.

* * * * *